United States Patent
Niu

(10) Patent No.: US 10,509,221 B2
(45) Date of Patent: Dec. 17, 2019

(54) HOLGRAPHIC DISPLAY DEVICE AND HOLOGRAPHIC DISPLAY METHOD

(71) Applicant: BOE TECHNOLOGY GROUP CO., LTD., Beijing (CN)

(72) Inventor: Bei Niu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 234 days.

(21) Appl. No.: 15/526,961

(22) PCT Filed: Sep. 12, 2016

(86) PCT No.: PCT/CN2016/098667
§ 371 (c)(1),
(2) Date: May 15, 2017

(87) PCT Pub. No.: WO2017/128730
PCT Pub. Date: Aug. 3, 2017

(65) Prior Publication Data
US 2018/0059618 A1 Mar. 1, 2018

(30) Foreign Application Priority Data
Jan. 25, 2016 (CN) .......................... 2016 1 0048819

(51) Int. Cl.
G03H 1/04 (2006.01)
G02B 26/08 (2006.01)
G03H 1/22 (2006.01)

(52) U.S. Cl.
CPC ........... *G02B 26/0816* (2013.01); *G03H 1/04* (2013.01); *G03H 1/2202* (2013.01);
(Continued)

(58) Field of Classification Search
CPC ............... G02B 27/221; G02B 26/002; G02B 26/0816; G02B 26/06; G03H 1/04;
(Continued)

(56) References Cited

U.S. PATENT DOCUMENTS 5,726,800 A    3/1998  Ezra
6,421,507 B1 * 7/2002  Heemstra .............. H01J 9/2273
                                                          396/546

(Continued)

FOREIGN PATENT DOCUMENTS

CN    103221873 A    7/2013
CN    105607454 A    5/2016
(Continued)

OTHER PUBLICATIONS

The World Intellectual Property Organization (WIPO) International Search Report and Written Opinion for PCT/CN2016/098667 dated Nov. 30, 2016 14 Pages.

*Primary Examiner* — Darryl J Collins
*Assistant Examiner* — Journey F Sumlar
(74) *Attorney, Agent, or Firm* — Anova Law Group, PLLC

(57) ABSTRACT

A holographic display device and holographic display method are provided. The holographic display device includes at least one light-source generator. The light-source generator includes: at least one laser device, configured to irradiate laser light; at least one light expander, configured to expand the laser light from the at least one laser device into a plurality of beams of light; and at least one light condenser, configured to condense the plurality of beams of light from the at least one light expander to generate a pair of virtual light sources capable of alternately emitting light at a predetermined frequency.

18 Claims, 3 Drawing Sheets

(52) U.S. Cl.
CPC ......... *G03H 1/2286* (2013.01); *G03H 1/2294* (2013.01); *G03H 2001/2242* (2013.01); *G03H 2222/34* (2013.01)

(58) Field of Classification Search
CPC ...... G03H 1/08; G03H 1/0866; G03H 1/0891; G03H 1/22; G03H 1/2202; G03H 1/2205; G03H 1/2286; G03H 1/2294; G03H 2001/2223; G03H 2001/2234; G03H 2001/2236; G03H 2001/2242; G03H 2001/2292; G03H 2222/20; G03H 2222/34; G03H 2222/36
See application file for complete search history.

(56) References Cited

U.S. PATENT DOCUMENTS

| | | |
|---|---|---|
| 2011/0157667 A1 | 6/2011 | Lacoste et al. |
| 2013/0265625 A1 | 10/2013 | Faecke et al. |

FOREIGN PATENT DOCUMENTS

| | | |
|---|---|---|
| JP | H0951552 A | 2/1997 |
| JP | H09222584 A | 8/1997 |
| JP | 2014153705 A | 8/2014 |
| KR | 20150088498 A | 8/2015 |

\* cited by examiner

HOLGRAPHIC DISPLAY DEVICE AND HOLOGRAPHIC DISPLAY METHOD

CROSS-REFERENCES TO RELATED APPLICATION

This application is a national phase entry under 35 U.S.C. § 371 of PCT patent application No. PCT/CN2016/098667, filed on Sep. 12, 2016, which claims the priority of Chinese Patent Application No. 201610048819.4, filed on Jan. 25, 2016, the entire contents of both of which are incorporated herein by reference.

TECHNICAL FIELD

The present disclosure generally relates to holographic display technology and, more particularly, relates to a holographic display device and a holographic display method.

BACKGROUND

Holography may generally be divided into two categories: optical holography and computer-generated holography. The computer-generated holography (CGH) uses computer to digitally generate coding information of the holographic image, and then reconstructs optical paths from coding information of the holographic image to display the holographic images. In computer-generated holography, view window type of the holographic display plays an important role. The primary goal of the view window type of holographic display is to reconstruct only a portion of wave-front that can be seen directly by a viewer. This portion of the wave-front is a surface section of a spherical wave-front, and is also called an observation window. The size of the observation window correlates with the size of viewer's pupil. The viewer can view a complete reconstructed three dimensional (3D) scene through the observation window.

FIG. 1 is a diagram illustrating an operation principle of a conventional view window type of holographic display. Computer generates encoded data of an object or a hologram, and displays the encoded images calculated corresponding to the coding information of the holographic image. That is, light transmittance of each pixel of a holographic display is calculated based on the coding information of the holographic image.

As shown in FIG. 1, light emitted from a light source 1 passed through a lens 2 and converged on a display screen 3, passes through each pixel of the display screen 3, and displays an image in an observation window 4. When a viewer positions an eye at the observation window 4, the viewer may see a complete 3D scene. The view window type of holographic display does not require coding information of the holographic image for each position on the viewing plane of the viewer. Thus, the amount of computing is reduced.

However, such holographic display method only displays images to one eye of the viewer, and gives the viewer a less, desired viewing experience.

The disclosed holographic display device and holographic display method are directed at least partially alleviate one or more problems set forth above and to solve other problems in the art.

SUMMARY

One aspect of present disclosure provides a holographic display device. The holographic display device includes at least one light-source generator, each including: at least one laser device, configured to irradiate laser light; at least one light expander, configured to expand the laser light from the at least one laser device into a plurality of beams of light; and at least one light condenser, configured to condense the plurality of beams of light from the at least one light expander to generate a pair of virtual light sources capable of alternately emitting light at a predetermined frequency.

Optionally, each the virtual light source is in a form of a virtual point light source having a predetermined divergence angle and producing an illuminating region having a predetermined area at a predetermined distance from the virtual light source.

Optionally, the holographic display device further includes: a collimator lens, configured for receiving the light emitted from each of the two virtual light sources to pass there-through and to be converged at a position corresponding to a view point, the two virtual light sources in each pair corresponding to two different view points.

Optionally, the holographic display device further includes: a processing device, configured to alternately generate, at the predetermined frequency, coding information of a holographic image corresponding to the two view points. When the processing device generates the coding information of the holographic image for any one of the two view points, a corresponding virtual light source is used as a light source for the one view point.

Optionally, the holographic display device further includes: a light modulator, located within an illuminating region of each virtual light source, and electrically connected to the processing device to display encoded hologram images corresponding to the coding information of the holographic image.

Optionally, the light-source generator includes: a laser device unit including the at least one laser device, a light expander unit including the at least one light expander, and a light condenser unit including the at least one light condenser. The light expander unit is disposed between the laser device unit and the light condenser unit, and the laser light, after passing through the light expander unit, provides the plurality of beams of light in parallel onto the at least one condenser to provide the two virtual light sources, the at least one condenser including a convex lens.

Optionally, the laser device unit includes two laser devices, the light expander unit includes two light expanders corresponding to the two laser devices, respectively, each light expander includes: a light inlet, configured for facing toward one of the laser devices to receive the corresponding laser light, and a light outlet, configured for facing toward the light condenser unit, and each light expander is configured to expand the laser light from the light inlet into the beams of the light to exit via the light outlet of the light expander.

Optionally, the laser device unit includes one laser device for providing the laser light, the light expander unit includes a light expander, a light splitter, and a first reflector, the light expander includes a light inlet configured for facing toward the one laser device to receive the laser light and a light outlet configured for facing toward the light splitter, the light expander expands the laser light from the light inlet into a plurality of beams of the light in parallel to exit via the light outlet of the light expander, the light splitter includes a light splitting film, facing toward the light outlet of the light expander, wherein the light splitter film allows a portion of the plurality of beams of light emitted from the light outlet of the light expander to pass through and reach the light condenser unit, and reflects another portion of the plurality of beams of light toward the first reflector, a reflective surface of the first reflector faces toward the light splitter and is tilted with an angle in a light outlet direction of the light expander, and the first reflector is used to reflect light reflected by the light splitting film toward the light condenser unit.

Optionally, the first reflector includes a prism having a light entering surface configured for facing toward the light splitter, and a light exiting surface configured for facing toward the light condenser unit, a reflective surface of the first reflector is connected with each of the light entering surface and the light exiting surface, the light reflected by the light splitter passes through the light entering surface of the first reflector to reach the reflective surface of the first reflector, and the reflective surface of the first reflector reflects the received light toward the light exiting surface.

Optionally, an aperture diaphragm is between the light inlet of each light expander and the laser device correspondingly for the laser light to pass through the aperture diaphragm to reach the light expander, and the aperture diaphragm is configured to exclude extraneous light from a periphery of the laser light to increase a brightness stability of the virtual light source.

Optionally, the at least one light condenser includes two convex lenses disposed between the light expander unit and a collimator lens, principal optical axes of the two convex lenses are in parallel with a principal optical axis of the collimator lens, and the two convex lenses converge the pluralities of beams of light from the light expander unit respectively into positions between the corresponding convex lenses and the collimator lens.

Optionally, the at least one light condenser includes two convex lenses and two second reflectors corresponding to the two convex lenses, respectively, principal optical axes of the two convex lenses intersect with or are perpendicular to a principal optical axis of the collimator lens, reflective surfaces of the two second reflectors are configured to face toward the light expander unit and form an angle with a light exiting direction of the light expander unit, the pluralities of beams of light from the light expander unit are directed to the reflective surfaces of the two second reflectors, respectively, the reflective surfaces of the two second reflectors reflect the received light toward the two corresponding convex lenses, respectively, the two convex lenses converge the pluralities of beams of light reflected by the two second reflectors respectively to provide two initial light sources, the light-source generator also includes a third reflector disposed between the two convex lenses, the third reflector is configured to reflect the light from the two initial light sources to the condenser lens, and the initial light source directed toward the collimator lens is configured to form the virtual light source.

Optionally, the second reflector includes a prism, having a light entering surface configured for facing toward the light expander unit, and a light exiting surface configured for facing toward the corresponding convex lens, a reflective surface of the second reflector is connected with each of the light entering surface and the light exiting surface, pluralities of beams of parallel light emitted from the light expander unit passes through the entering surfaces of the two second reflectors to reach the two corresponding reflective surfaces, respectively, the reflective surface of each second reflector is configured to reflect the light toward the light exiting surface, and the light reflected by each reflective surface is configured to pass through the light exiting surface to reach the corresponding convex lens.

Optionally, the third reflector includes only one reflective surface and is configured to receive light from at most one initial light source at any moment, an electric motor is connected to the third reflector, the electric motor is used to drive the third reflector to rotate around a predetermined axis such that the reflective surface reflects light from the at most one initial light source toward the collimator lens at any moment, the electric motor is electrically connected to the processing device, and when the processing device generates the coding information of the holographic image corresponding to any one of the two view points, the processing device is configured to control the electric motor to operate such that the reflective surface of the third reflector is configured to reflect the light from the initial point light source corresponding to the selected view point toward the collimator lens.

Optionally, the third reflector includes two reflective surfaces facing toward the two convex lenses, and each reflective surface is configured to reflect the light from a corresponding initial light source toward the collimator lens.

Optionally, a light barrier is disposed between each convex lens and the laser device, the light barrier is used to allow the laser light to pass through from the laser device to the corresponding convex lens when the light barrier is open, and to block the laser light from the laser device to the corresponding convex lens when the light barrier is closed, the two light barriers corresponding to the two convex lenses open and close alternately, the two light barriers are electrically connected to the processing device, and when the processing device generates the coding information of the holographic image corresponding to a view point, the processing device opens the light barrier corresponding to the laser device for the view point.

Another aspect of present disclosure provides a holographic display method including: alternately generating, at a predetermined frequency, coding information of a holographic image corresponding to two view points; and alternately generating two virtual light sources, at the predetermined frequency, corresponding to the two view points. The two virtual light sources emit light toward a light modulator of a holographic display device. When generating the coding information of the holographic image for any one of the two view points, light emitted from each of the two virtual light sources passes through a display area of the light modulator and converges at a position corresponding to a view point.

Optionally, each virtual light source is a point light source with predetermined divergence angle.

Optionally, each virtual light source produces an illuminating region with a predetermined area at a predetermined distance from the virtual light source and the two virtual light sources alternately emit light at the predetermined frequency.

Optionally, the light modulator is located within an illuminating region of each virtual light source, and displays encoded hologram images corresponding to the coding information of the holographic image.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Various exemplary holographic display devices and holographic display methods are provided according to various embodiments of the present disclosure.

In one embodiment, the holographic display device includes a backlight device. The backlight device includes at least one light-source generator. Each light-source generator includes a laser device unit including at least one laser device, a light expander unit including at least one light expander, and a light condenser unit including at least one light condenser. The light-source generator is configured, such that laser light irradiated from the at least one laser device, after passing through the at least one light expander and the at least one light condenser, generates a pair of virtual light sources capable of alternately emitting light at a predetermined frequency.

Figure 1:
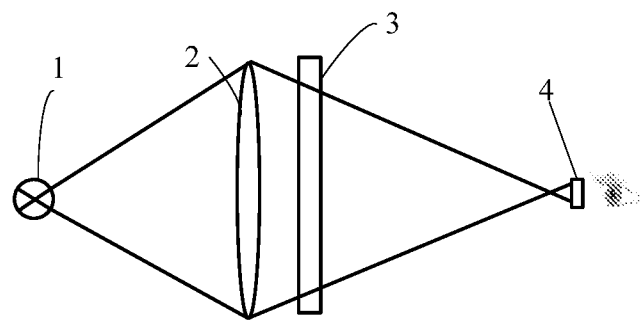
FIG. 1 is a diagram illustrating an operation principle of a conventional view window type of holographic display.
Figure 2:
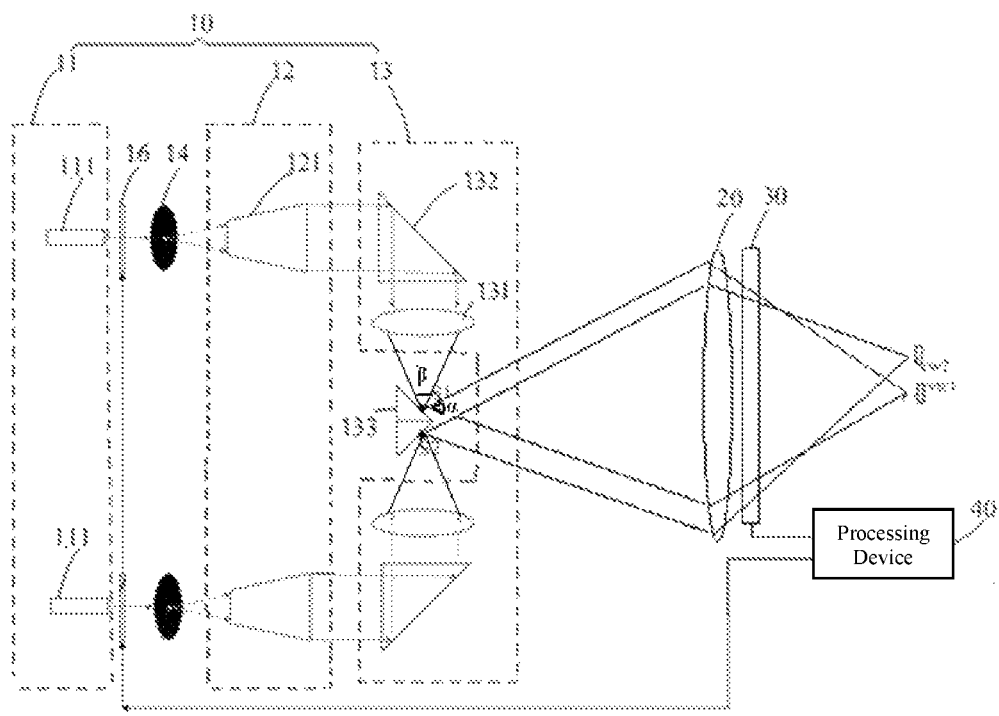
FIG. 2 is a diagram illustrating an exemplary holographic display device according to various disclosed embodiments.

FIG. 2 is a diagram illustrating an exemplary holographic display device according to the present disclosure. As shown in FIG. 2, the holographic display device may include a backlight device, a processing device 40, and a light modulator 30.

The backlight device may include a collimator lens 20 and at least one light-source generator 10. The backlight device may be configured on one side of the collimator lens 20 facing away from the light modulator 30. Each light-source generator 10 may be used to generate a pair of virtual light sources, corresponding to a pair of view points, i.e., view point vw1 and view point vw2, as shown in FIG. 2. Each virtual light source may produce an illuminating region with a predetermined area at a predetermined distance from the light source. The pair of virtual light sources may emit light alternately at a predetermined frequency. The predetermined frequency may be determined to allow light emitted from the pair of virtual light sources, after passing through the collimator lens 20, to converge at the two view points, respectively.

The processing device 40 may be used to alternately generate, at a predetermined frequency, coding information of the holographic image which corresponds to a view point vw1 and a view point vw2. When the processing device 40 generates the coding information of the holographic image for any one of the two view points, the virtual light source emitting the light may correspond to the specific view point.

The light modulator 30 may be configured on the side of the collimator lens 20 facing away from the light-source generator 10. The light modulator 30 may be located within the illuminating region of each virtual light source. The light modulator 30 may be electrically connected to the processing device 40 to display encoded hologram images corresponding to the coding information of the holographic image.

When displaying hologram images, the processing device 40 may generate the holographic image data by calculating light transmittance data based on light-wave complex amplitude distribution on certain holographic plane. The holographic image data may be transmitted to the light modulator 30 to display the corresponding encoded hologram images.

Specifically, the light modulator 30 may include a display panel. The encoded hologram image may include a grayscale image with a plurality of pixel units having different gradation or different light transmittance. The light emitted from each virtual light source may diffract at each pixel unit. The collimator lens 20 may make the diffracted light converge. Further, the two view points may be located behind the convergence positions. When a viewer is positioned further behind the convergence position, the converged light may propagate to human eye located at the each view point. Thus, the viewer may see the reconstructed 3D scene.

Generally, a backlight device in a conventional holographic display device may only include a single light source. The light emitted from the virtual light source may converge at a single position to form a single view point. When the viewer views at the view point, the viewer may only see a reconstructed 3D scene with one eye.

In one embodiment, the holographic display device according to the present disclosure may include at least a pair of virtual light sources in the backlight device. The two virtual light sources of the pair may emit light alternately. The processing device 40 may generate the holographic image data alternately corresponding to the two view points, and may control the light modulator 30 to display the encoded hologram image according to the holographic image data.

In addition, when the processing device 40 generates the holographic image data corresponding to one view point, the virtual light source in the backlight device corresponding to the view point may irradiate light toward the light modulator accordingly. When both eyes of the viewer are positioned at the two view points respectively, the viewer may alternately see the reconstructed images in both eyes. Further, when the holographic image data are switched fast enough, the viewer may have the perception of seeing continuous 3D scenes in both eyes. Thus, the viewer's viewing experience is improved.

Specifically, the distance between the two virtual light sources may be adjusted according to the distance between two eyes of a viewer. Alternatively, the focal length of the collimator lens 20 may be adjusted. In either case, after passing through the collimator lens 20, the light emitted from the two virtual light sources may converge at two convergence positions, which correspond to the positions of the two human eyes of the viewer.

FIGS. 2-5 are diagrams illustrating exemplary holographic display devices according to the present disclosure. In order to increase the display brightness, as shown in FIGS. 2-5, the virtual light sources may be point virtual light sources (for example, including virtual point light source S1 or virtual point light source S2) with a predetermined divergence angle α. Each point light source may form an illuminating region with a predetermined area at a predetermined distance from the point light source. In one embodiment, in a holographic display device having a backlight device, a light modulator 30 (for example, a display panel) may be configured within the illuminating region of each virtual light source to let the light emitted from each virtual light source evenly pass through the light modulator 30.

In order to form a virtual point light source with a predetermined divergence angle α, as shown in FIGS. 2-5, the light-source generator 10 may include a laser device unit 11, a light expander unit 12, and a light condenser unit 13. The light expander unit 12 may be configured between the laser device unit 11 and the light condenser unit 13.

The laser device unit 11 may be used to irradiate laser light toward the light expander unit 12. The light expander unit 12 may expand the laser light received from the laser device unit 11 into a plurality of beams of light toward the light condenser unit 13. The light condenser unit 13 may be used to condense the plurality of beams of light from the light expander unit 12 to form two virtual light sources (for example, virtual point light source S1 and virtual point light source S2). Because the laser light is highly coherent, each laser light may be expanded and then condensed to form a point light source with stable brightness.

Figure 3:
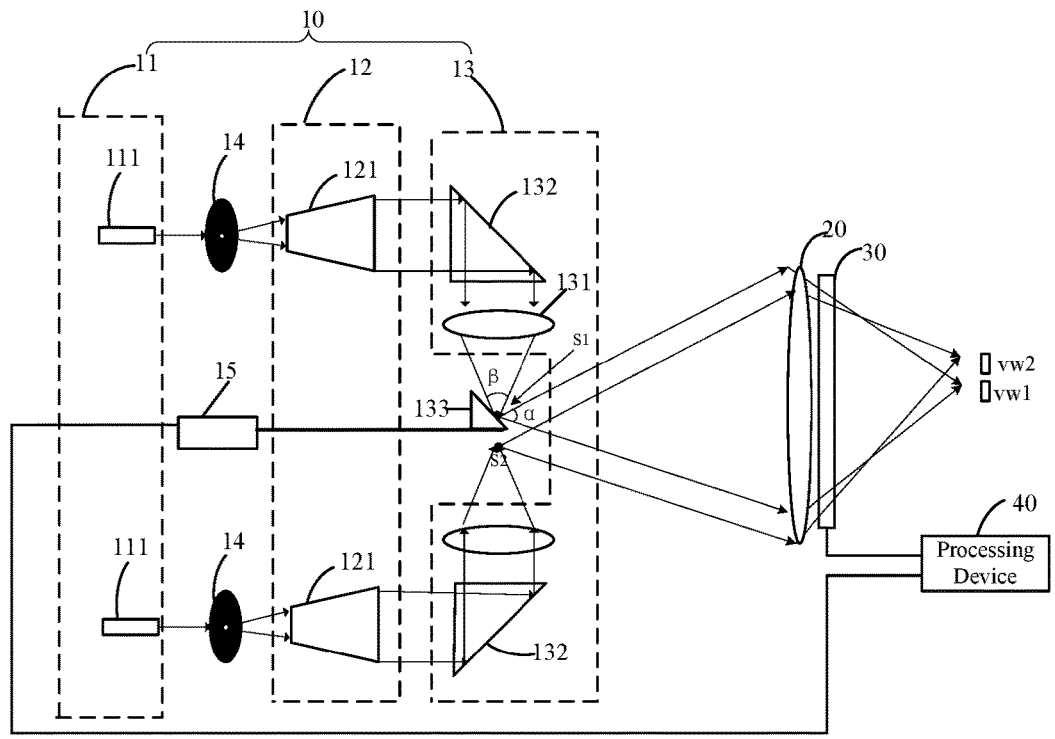
FIG. 3 is a diagram illustrating another exemplary holographic display device according to various disclosed embodiments.
Figure 4:
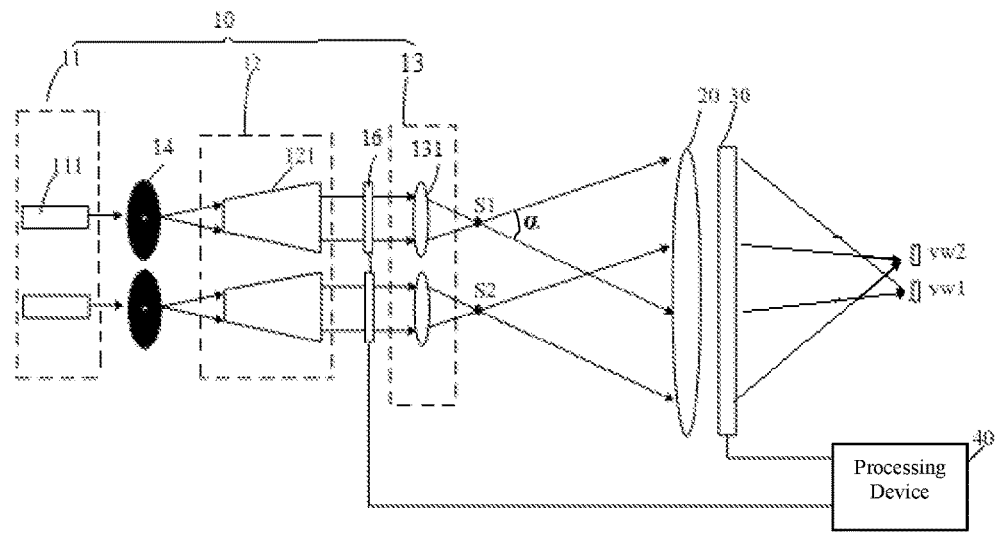
FIG. 4 is a diagram illustrating another exemplary holographic display device according to various disclosed embodiments.

In one embodiment, as shown in FIGS. 2-4, the laser device unit 11 may be used to irradiate multiple sets of laser light. For example, the laser device unit 11 may include at least one laser device, for example, two laser devices 111. Each laser device 111 may irradiate one set of laser light.

The light expander unit 12 may include at least one light expander, for example, two light expanders 121 corresponding to the two laser light devices 111, respectively. The light expander 121 may include a light inlet configured for facing toward the laser device unit 11 and a light outlet configured for facing toward the light condenser unit 13. The light inlet of each light expander 121 may be used to receive the corresponding laser light. Each light expander 121 may be used to expand the laser light received from the light inlet into beams light in parallel and to exit via the light outlet of the light expander 121.

Figure 5:
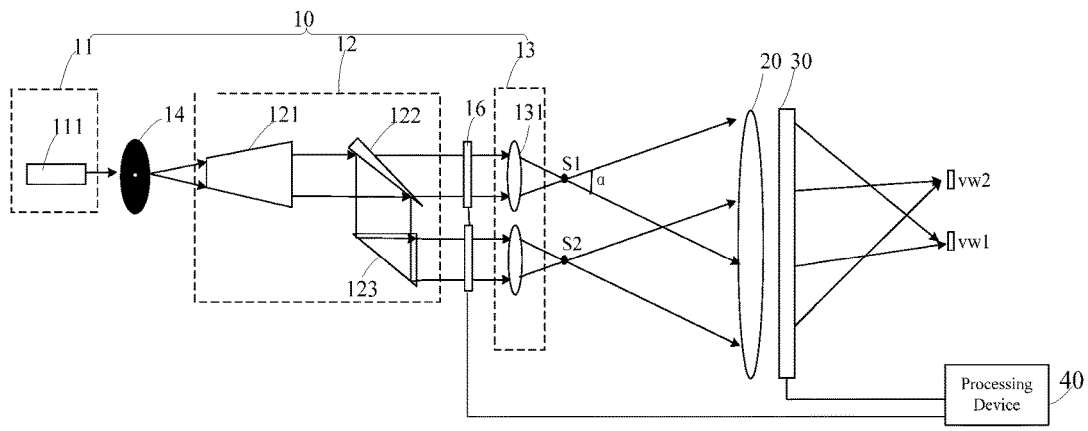
FIG. 5 is a diagram illustrating another exemplary holographic display device according to various disclosed embodiments.

In another embodiment, as shown in FIG. 5, the laser device unit 11 may be used to irradiate only one set of laser light. For example, the laser device unit 11 may include a laser device 111 to irradiate one set of laser light. The light expander unit 12 may include a light expander 121, a light splitter 122, and a first reflector 123. The light expander 121 may include a light inlet configured for facing toward the laser device 111 and a light outlet configured for facing toward the light splitter 122. The light inlet of the light expander 121 may be used to receive the laser light irradiated from the laser device 111. The light expander 121 may be used to expand the laser light received from the light inlet into beams of light and to exit via the light outlet of the light expander 121.

The light splitter 122 may include a light splitting film. The light splitting film may face toward the light outlet of the light expander 121. A portion of beams of parallel light emitted from the light outlet of light expander 121 may pass through and reach the light condenser unit 13. Another portion of the beams of the parallel light may be reflected toward the first reflector 123. The reflective surface of the first reflector 123 may face toward the light splitter 122, and may be tilted with an angle in the light outlet direction of the light expander 121. The first reflector 123 may be used to reflect the light reflected by the light splitting film toward the light condenser unit 13.

Further, the first reflector 123 may include a prism. The first reflector 123 may also include a light entering surface configured for facing toward the light splitter 122 and a light exiting surface configured for facing toward the light condenser unit 13. The reflective surface of the first reflector 123 may be connected with each of the light entering surface and the light exiting surface. The light reflected by the light splitter 122 may pass through the light entering surface of the first reflector 123 to reach the reflective surface of the first reflector 123. The reflective surface of the first reflector 123 may be used to reflect the received light toward the light exiting surface.

Specifically, the light splitting film of the light splitter 122 may have a 45° angle with respect to the light exiting direction of the light expander 121. The first reflector 123 may be an isosceles right angle prism. That is, the light entering surface and the light exiting surface of the first reflector 123 may be perpendicular to each other. In addition, the reflective surface of the first reflector 123 may be parallel with the light splitting film of the light splitter 122.

In actual applications, the light transmittance of the light splitting film of the light splitter 122 may be adjusted to make the light reflected by the light splitting film and the light passing through the light splitting film substantially the same. Thus, two identical or similar point virtual light sources may be obtained.

Further, as shown in FIGS. 2-5, an aperture diaphragm 14 having a substantially small aperture may be disposed between the light inlet of each light expander 121 and the laser device 111. The laser device 111 may irradiate a laser light through the corresponding aperture diaphragm 14 to reach the corresponding light expander 121. The aperture diaphragm 14 may exclude extraneous light from the periphery of the laser light irradiated from the laser device 11 to increase the brightness stability of the formed virtual point light source.

Specifically, in one embodiment, the light condenser unit 13 may have an exemplary structure as shown in FIGS. 4-5. The light condenser unit 13 may include at least one light condenser including, for example, at least one convex lens such as two convex lenses 131 disposed between a light expander unit 12 and a collimator lens 20. The principal optical axes of the two convex lenses 131 may be in parallel with the principal optical axis of the collimator lens 20. The two convex lenses 131 may be used to converge pluralities of beams of parallel light emitted from the light expander unit 12 respectively into positions between the corresponding convex lenses 131 and the collimator lens 20.

In one embodiment, as shown in FIG. 4, when the light expander unit 12 includes two light expanders 121, the two convex lenses 131 may be positioned corresponding to the two light expanders 121 respectively to converge the pluralities of beams of parallel light emitted from the two light expanders 121.

In another embodiment, as shown in FIG. 5, when the laser device 111 irradiates one set of laser light and the light expander unit 12 includes a light expander 121, a light splitter 122, and a first reflector 123, the two convex lenses 131 may be positioned corresponding to the light splitter 122 and the first reflector 123 respectively to converge the beams of parallel light passing through the light splitter 122 and the beams of parallel light reflected by the first reflector 123.

In another embodiment, the light condenser unit 13 may have another exemplary structure as shown in FIGS. 2-3. The light condenser unit 13 may include at least one light condenser, such as, two convex lenses 131, and two second reflectors 132 corresponding to the two convex lenses 131, respectively. The principal optical axes of the two convex lenses 131 may intersect with or be perpendicular to the principal optical axis of the collimator lens 20. The reflective surfaces of the two second reflectors 132 may face toward the light expander unit 12, and may form an angle with the light exiting direction of the light expander unit 12. The pluralities of beams of parallel light emitted from the light expander unit 12 may be directed to the reflective surfaces of the two second reflectors 132, respectively. The reflective surfaces of the two second reflectors 132 may be used to reflect the received light toward the two corresponding convex lenses 131, respectively.

The two convex lenses 131 may be used to converge pluralities of beams of parallel light reflected by the two second reflectors 132 respectively to form two initial, virtual, point light sources. The light-source generator 10 may also include a third reflector 133 disposed between the two convex lenses 131. The third reflector 133 may be used to reflect the light from the two initial, virtual, point light sources to the collimator lens 20. The two initial, virtual, point light sources directing light toward the collimator lens 20 may form the desired virtual point light sources.

In one embodiment, after passing through each convex lens 131, light may converge and continue to propagate. Light may converge at a convergence point. The light at the convergence point may form an initial point light source. Due to the presence of the third reflector 133, light from the virtual point light sources may be directed to the collimator lens 20. The initial, virtual, point light sources directing light toward the collimator lens 20 may form virtual point light source S1 and virtual point light source S2. The beams of parallel light reflected by the second reflector 132 toward the convex lens 131 and converged by the convex lens 131 may have a convergence angle γ. The convergence angle γ may be the same as the divergence angle α.

Further, the second reflector 132 may include a prism. The second reflector 132 may also include a light entering surface configured for facing toward the light expander unit 12 and a light exiting surface configured for facing toward the corresponding convex lens 131. The reflective surface of the second reflector 132 may be connected with each of the light entering surface and the light exiting surface. Pluralities of beams of parallel light emitted from the light expander unit 12 may pass through the entering surfaces of the two second reflectors 132 to reach the two corresponding reflective surfaces, respectively. The reflective surface of each second reflector 132 may be used to reflect the received light toward the light exiting surface. The light reflected by each reflective surface may pass through the light exiting surface to reach the corresponding convex lens 131.

The second reflector 132 may be an isosceles right angle prism. That is, the light entering surface and the light exiting surface of the first reflector 123 may form a 45° angle with respect to the reflective surface. As shown in FIGS. 2-3, light exiting direction of the light expander 121 may be parallel with the principal optical axis of the collimator lens 20. The reflective surface of the second reflector 132 may form a 45° angle with respect to the light exiting direction of the light expander 121. The principal optical axis of the convex lens 131 and the principal optical axis of the collimator lens 20 may be perpendicular to each other.

Because a distance between viewer's two eyes is within a certain range, in order to make two convergence positions where the light emitted from the virtual point light source S1 and virtual point light source S2 are converged by the collimator lens 20 match two eye positions of the viewer respectively, the distance between the virtual point light source S1 and the virtual point light source S2 may not be too large. When the virtual point light source S1 and the virtual point light source S2 are formed as shown in FIGS. 2-3, the distance between the virtual point light source S1 and the virtual point light source S2 may not be limited by the size of the convex lenses 131, and may be adjusted to any suitable value.

In one embodiment, as shown in FIG. 2, the third reflector 133 may include two reflective surfaces facing toward two convex lenses 131, respectively. Each reflective surface may reflect the light from the corresponding initial, virtual, point light source converged by the corresponding convex lens 131 toward the collimator lens 20. Both reflective surfaces may form a 45° angle with respect to the principal optical axis of the collimator lens 20.

In another embodiment, as shown in FIG. 3, the third reflector 133 may include only one reflective surface and may receive light from at most one initial, virtual, point light source at any moment. The reflective surface receiving light from either the virtual point light source S1 or the virtual point light source S2 may form a 45° angle with respect to the principal optical axis of the collimator lens 20.

In various embodiments, different structures may be used to achieve transmitting light toward the light modulator 30 alternately from the disclosed two virtual light sources.

In order to make the reflective surface of the third reflector 133 receive light from at most one initial, virtual, point light source at any moment, as shown in FIG. 3, the backlight device may also include an electric motor 15 connected to the third reflector 133. The electric motor 15 may be used to drive the third reflector 133 to rotate around a predetermined axis such that the reflective surface may reflect light from at most one point light source toward the collimator lens 20 at any moment.

The electric motor 15 may be electrically connected to the processing device 40. When the processing device 40 generates holographic image data corresponding to any one of the two view points, the processing device 40 can control the electric motor 15 to operate in such a way that the reflective surface of the third reflector 133 can reflect the light from the initial point light source corresponding to the selected view point toward the collimator lens 20.

Each beam of parallel light emitted from the expander unit 12 may be reflected by the second reflector 132 and may be converged by the convex lens 131 to form two initial, virtual, point light sources. When the electric motor 15 drives the third reflector 133 to rotate to a position as shown in FIG. 3, one initial, virtual, point light source may be positioned on the reflective surface of the third reflector 133. The reflective surface may reflect the light from the initial, virtual, point light source toward the collimator lens 20 with a predetermined divergence angle α. Thus, a virtual point light source S1 is formed. The virtual point light source S1 may transmit light toward the collimator lens 20 to pass through the collimator lens 20 and then to converge at a position in front of the view point vw1.

As shown in FIG. 3, the third reflector 133 may be rotated until the other initial, virtual, point light source is positioned on the reflective surface. The reflective surface may reflect the light from the other initial point light source toward the collimator lens 20 with a predetermined divergence angle α. Thus, a virtual point light source S2 is formed. The virtual point light source S2 may transmit light toward the collimator lens 20 to pass through the collimator lens 20 and then to converge at a position in front of the view point vw2.

When the third reflector 133 includes two reflective surfaces facing toward two convex lenses 131 as shown in FIG. 2 or when the light condenser unit 13 includes two convex lenses 131 having principal optical axes parallel with the principal optical axis of the collimator lens 20 as shown in FIGS. 4-5, in order to alternately transmitting light from two initial, virtual, point light sources to the light modulator 30, a light barrier 16 may be configured between each convex lens 131 and the laser device unit 11. The light barrier 16 may be used to pass light from the laser device unit 11 to the corresponding convex lens 131 when the light barrier 16 is open, and to block light from the laser device unit 11 to the corresponding convex lens 131 when the light barrier 16 is closed. The two light barriers 16 corresponding to the two convex lenses 131 may open and close alternately.

In addition, the two light barriers 16 may be electrically connected to the processing device 40. When the processing device 40 generates holographic image data corresponding to a view point, the processing device 40 can open the light barrier 16 corresponding to the laser device for the view point. Thus, viewer's two eyes may see holographic images alternately at the view point vw1 and the view point vw2 to perceive 3D scene.

The two light barriers 16 may be disposed at any suitable positions as long as the two light barriers 16 are disposed between the laser device unit 11 and the corresponding convex lenses 131, respectively. In one embodiment, the laser device unit 11 may include two laser devices 111, and the light expander unit 12 may include two light expanders 121. In this case, as shown in FIG. 2, a light barrier 16 may be disposed between each laser device 111 and the corresponding aperture diaphragm 14.

In another embodiment, as shown in FIG. 4, a light barrier 16 may be disposed between each light expander 121 and the corresponding convex lens 131. Alternatively, a light barrier 16 may be disposed between each aperture diaphragm 14 and the corresponding light expander 121.

In another embodiment, as shown in FIG. 5, the laser device unit 11 may include only one laser device 111. The light expander unit 12 may include a light expander 121, a light splitter 122, and a first reflector 123. In this case, a light barrier 16 may be disposed between the light splitter 122 and the corresponding convex lens 131, and another light barrier 16 may be disposed between the first reflector 123 and the corresponding convex lens 131.

Figure 6:
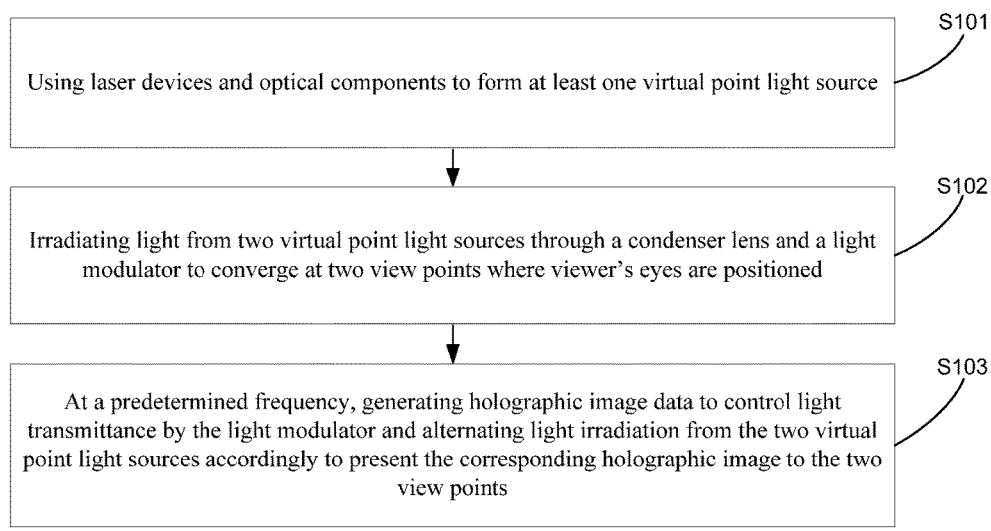
FIG. 6 is a flow chart illustrating an exemplary holographic display method according to various disclosed embodiments.

In another aspect, the present disclosure provides a holographic display method. FIG. 6 is a flow chart illustrating an exemplary holographic display method according to the present disclosure. As shown in FIG. 6, the holographic display method may include the following steps.

Step S101: using laser devices and optical components to form at least one virtual point light source.

Specifically, lasers, light expanders, light splitters, reflectors, and convex lens, etc., may be used to form at least one virtual point light source. Laser light may be expanded into beams of parallel light which can then be condensed by a collimator lens to form a virtual point light source with stable brightness.

Step S102: irradiating light from two virtual point light sources through a collimator lens and a light modulator to converge at two view points where viewer's eyes are positioned.

Specifically, the two virtual point light sources may be used to irradiate light with stable brightness through a collimator lens and a light modulator to converge at two view points. The collimator lens may be used to converge the light at the two view points, and the light modulator may be used to modulate the light to display images corresponding to the two view points. A viewer may position eyes at the two view points.

Step S103: at a predetermined frequency, generating holographic image data to control light transmittance by the light modulator and alternating light irradiation from the two virtual point light sources accordingly to present the corresponding holographic image to the two view points.

Specifically, the two virtual point light sources may be turned on alternately at a predetermined frequency such that images displayed by the light modulator can be seen only at one view point at a time. A processing device may be used to generate holographic image data to control the light modulator to display the image corresponding to the view point illuminated by the point light source that is turned on.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art.

The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims.

Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A holographic display device, comprising:
    at least one light-source generator, each including:
        a laser device unit including at least one laser device, configured to irradiate laser light;
        a light expander unit including at least one light expander, configured to expand the laser light from the at least one laser device into a plurality of beams of light; and
        a light condenser unit including at least one light condenser, configured to condense the plurality of beams of light from the at least one light expander to generate a pair of virtual light sources capable of alternately emitting light at a predetermined frequency, wherein:
            the at least one light condenser includes two convex lenses and two first reflectors corresponding to the two convex lenses, respectively, principal optical axes of the two convex lenses intersect with or are perpendicular to a principal optical axis of a collimator lens, reflective surfaces of the two first reflectors are configured to face toward the light expander unit and form an angle with a light exiting direction of the light expander unit, the plurality of beams of light from the light expander unit are formed in parallel and directed to the reflective surfaces of the two first reflectors, respectively, the reflective surfaces of the two first reflectors reflect the received light toward the two corresponding convex lenses, respectively, the two convex lenses converge the plurality of beams of light reflected by the two first reflectors respectively to provide two initial light sources, the light-source generator further includes a second reflector disposed between the two convex lenses, the second reflector is configured to reflect the light from the two initial light sources to the collimator lens, and the initial light sources directed toward the collimator lens are configured to form the virtual light sources.

2. The holographic display device of claim 1, wherein:
each the virtual light source of the virtual light sources is in a form of a virtual point light source having a predetermined divergence angle and producing an illuminating region having a predetermined area at a predetermined distance from the virtual light source.

3. The holographic display device of claim 1, further including:
the collimator lens, configured for receiving the light emitted from each of the two virtual light sources to pass there-through and to be converged at a position corresponding to a view point, the two virtual light sources corresponding to two different viewpoints.

4. The holographic display device of claim 3, further including:
a processing device, configured to alternately generate, at the predetermined frequency, coding information of a holographic image corresponding to the two viewpoints,
wherein, when the processing device generates the coding information of the holographic image for any one of the two viewpoints, a corresponding virtual light source is configured as a light source for the view point.

5. The holographic display device of claim 4, further including:
a light modulator, located within an illuminating region of each virtual light source of the virtual light sources, and electrically connected to the processing device to display encoded hologram images corresponding to the coding information of the holographic image.

6. The holographic display device of claim 1, wherein:
the laser device unit includes two laser devices,
the light expander unit includes two light expanders corresponding to the two laser devices, respectively,
each light expander includes: a light inlet configured for facing toward one of the laser devices to receive the corresponding laser light, and a light outlet configured for facing toward the light condenser unit, and
each light expander is configured to expand the laser light from the light inlet into the beams of the light to exit via the light outlet of the light expander.

7. The holographic display device of claim 6, wherein:
an aperture diaphragm is between the light inlet of each light expander and the laser device correspondingly for the laser light to pass through the aperture diaphragm to reach the light expander, and
the aperture diaphragm is configured to exclude extraneous light from a periphery of the laser light to increase a brightness stability of the virtual light source.

8. The holographic display device of claim 1, wherein:
the laser device unit includes one laser device for providing the laser light,
the light expander unit includes one light expander, a light splitter, and a third reflector,
the light expander includes a light inlet configured for facing toward the one laser device to receive the laser light, and a light outlet configured for facing toward the light splitter,
the light expander expands the laser light from the light inlet into the plurality of beams of the light in parallel to exit via the light outlet of the light expander,
the light splitter includes a light splitting film facing toward the light outlet of the light expander, wherein the light splitter film allows a portion of the plurality of beams of light emitted from the light outlet of the light expander to pass through and reach the light condenser unit, and reflects another portion of the plurality of beams of light toward the third reflector,
a reflective surface of the third reflector faces toward the light splitter and is tilted with an angle in a light outlet direction of the light expander, and
the third reflector is configured to reflect light reflected by the light splitting film toward the light condenser unit.

9. The holographic display device of claim 8, wherein:
the third reflector includes a prism having a light entering surface configured for facing toward the light splitter, and a light exiting surface configured for facing toward the light condenser unit,
a reflective surface of the third reflector is connected with each of the light entering surface and the light exiting surface,
the light reflected by the light splitter passes through the light entering surface of the third reflector to reach the reflective surface of the third reflector, and
the reflective surface of the third reflector reflects the received light toward the light exiting surface.

10. The holographic display device of claim 1, wherein:
the first reflector includes a prism, having a light entering surface configured for facing toward the light expander unit, and a light exiting surface configured for facing toward the corresponding convex lens,
a reflective surface of the first reflector is connected with each of the light entering surface and the light exiting surface,
the plurality of beams of parallel light emitted from the light expander unit passes through the entering surfaces of the two first reflectors to reach the two corresponding reflective surfaces, respectively,
the reflective surface of each first reflector is configured to reflect the light toward the light exiting surface, and
the light reflected by each reflective surface is configured to pass through the light exiting surface to reach the corresponding convex lens.

11. The holographic display device of claim 1, wherein:
the second reflector includes only one reflective surface and is configured to receive light from at most one initial light source, an electric motor is connected to the second reflector,
the electric motor is configured to drive the second reflector to rotate around a predetermined axis such that the reflective surface reflects light from the at most one initial light source toward the collimator lens,
the electric motor is electrically connected to the processing device, and
when the processing device generates the coding information of the holographic image corresponding to any one of the two viewpoints, the processing device is configured to control the electric motor to operate such that the reflective surface of the second reflector is configured to reflect the light from the initial point light source corresponding to the view point toward the collimator lens.

12. The holographic display device of claim 1, wherein:
the second reflector includes two reflective surfaces facing toward the two convex lenses, and
each reflective surface is configured to reflect the light from a corresponding initial light source toward the collimator lens.

13. A holographic display device, comprising at least one light-source generator, each including:
a laser device unit including at least one laser device, configured to irradiate laser light;
a light expander unit including at least one light expander, configured to expand the laser light from the at least one laser device into a plurality of beams of light; and
a light condenser unit including at least one light condenser, configured to condense the plurality of beams of light from the at least one light expander to generate a pair of virtual light sources capable of alternately emitting light at a predetermined frequency, wherein:
the light expander unit is disposed between the laser device unit and the light condenser unit,
the at least one light condenser includes two convex lenses disposed between the light expander unit and a collimator lens,
principal optical axes of the two convex lenses are in parallel with a principal optical axis of the collimator lens, and
the two convex lenses converge the plurality of beams of light in parallel from the light expander unit respectively into positions between the corresponding convex lenses and the collimator lens.

14. The holographic display device of claim 13, wherein:
a light barrier is disposed between each convex lens and the laser device,
the light barrier is configured to allow the laser light to pass through from the laser device to the corresponding convex lens when the light barrier is open, and to block the laser light from the laser device to the corresponding convex lens when the light barrier is closed,
the two light barriers corresponding to the two convex lenses open and close alternately,
the two light barriers are electrically connected to the processing device, and
when the processing device generates the coding information of the holographic image corresponding to the view point, the processing device opens the light barrier corresponding to the laser device for the view point.

15. A holographic display method implemented in a holographic display device that includes at least one laser device, at least one light expander, and at least one light condenser, comprising:
alternately generating, at a predetermined frequency, coding information of a holographic image corresponding to two view points;
expanding, through the at least one laser light expander, laser light irradiated from the at least one laser device into a plurality of beams of light in parallel;
condensing, through the at least one light condenser, the plurality of beams of light from the at least one light expander, wherein:
the at least one light condenser includes two convex lenses and two first reflectors corresponding to the two convex lenses, respectively,
principal optical axes of the two convex lenses intersect with or are perpendicular to a principal optical axis of a collimator lens,
reflective surfaces of the two first reflectors are configured to face toward the at least one light expander and form an angle with a light exiting direction of the at least one light expander, and
condensing the plurality of beams of light includes:
directing the plurality of beams of parallel light to the reflective surfaces of the two first reflectors, respectively;
reflecting, through the reflective surfaces of the two first reflectors, the received light toward the two corresponding convex lenses, respectively; and
converging, through the two convex lenses, the plurality of beams of light reflected by the two first reflectors respectively to provide two initial light sources;
reflecting, through a second reflector, the light from the two initial light sources to the collimator lens, the second reflector being disposed between the two convex lenses; and
alternately generating two virtual light sources from the initial light sources, at the predetermined frequency, corresponding to the two viewpoints, wherein:
the two virtual light sources emit light toward a light modulator of the holographic display device, and
when generating the coding information of the holographic image for any one of the two viewpoints, light emitted from each of the two virtual light sources passes through a display area of the light modulator and converges at a position corresponding to a view point of the two view points.

16. The holographic display method of claim 15, wherein:
each virtual light source of the virtual light sources is a point light source with predetermined divergence angle.

17. The holographic display method of claim 15, wherein:
each virtual light source of the virtual light sources produces an illuminating region with a predetermined area at a predetermined distance from the virtual light source and the two virtual light sources alternately emit light at the predetermined frequency.

18. The holographic display method of claim 15, wherein:
the light modulator is located within an illuminating region of each virtual light source, and displays encoded hologram images corresponding to the coding information of the holographic image.

* * * * *